Patented Aug. 29, 1939

2,171,041

UNITED STATES PATENT OFFICE 2,171,041

FLUX FOR WELDING MAGNESIUM AND MAGNESIUM ALLOYS

Josef Martin Michel, Bitterfeld, Germany, assignor, by mesne assignments, to Magnesium Development Corporation, a corporation of Delaware No Drawing. Application February 6, 1937, Serial No. 124,465. In Germany December 14, 1934

10 Claims. (Cl. 148—26)

The present invention relates to a flux for welding magnesium and magnesium alloys and is a continuation-in-part of application Serial No. 52,666 filed December 3, 1935.

In welding magnesium and magnesium alloys it is customary to use fluxes containing, as substantial constituent, halides of the alkali and/or alkaline earth metals, and more particularly chlorides or bromides of these metals. The use of such halides which are not volatile at the welding temperature, is intended to prevent the energetic oxidation of the magnesium which occurs at the welding temperatures, or to absorb any oxygen compounds nevertheless formed, by the melting halides, so as to enable an intimate and secure union of the welded surfaces to be obtained. Experience has, however, shown that, with this process, traces of the halide containing flux become entrapped or included in the metal and so, in course of time, give rise to efflorescence at the welds and, subsequently also to decomposition of the magnesium as the result of a kind of chain reaction of the latter with the traces of flux which have become hydrolysed through the absorption of atmospheric moisture.

The present invention is based on the conception of preventing this progressive destruction of the metal by converting any traces of flux which may become included in the metal and other such traces thereof as cannot be removed from the seat of the weld (for example by rinsing or the like), into a harmless form by volatilising that constituent—namely, the halogen ion—of the saline mixture which causes the chain reaction, this being effected by decomposing the salt. To this end, there are added to fluxes containing an inorganic halide, being not volatile at the welding temperature, as for instance halides of the alkali and/or alkaline earth metals, suitable for welding magnesium or magnesium alloys, either acid salts of such acids, or such acids themselves, as are at the welding temperatures less volatile and therefore more powerful than the halogen hydracid concerned (such as hydrochloric acid), the added acid salt or acid being of such a nature that neither it nor any of its products of reaction, which may be formed in the course of the welding process have a corrosive action upon the magnesium or magnesium alloys with the welding mixture proper. At the temperatures of welding the halide constituents of the flux are decomposed liberating the corresponding halogen hydracid which volatilises, and forming neutral salts of the less volatile acid, which salts are harmless to the metal.

Since, for reasons of convenience, fluxes are generally used in the form of powder, it is advantageous to employ such acid salts or acids, as are also obtainable in powder form. The selection of the particular acid salt or acid to be used in accordance with the invention is also influenced by the consideration that it is desirable to employ a composition having a melting point not too far below the melting point of the metal.

Alkali orthophosphates having an acid reaction, and particularly monopotassium phosphate, have been found specially suitable for the purposes of the present invention. Monoammonium phosphate, or monosodium phosphate, and also alkali pyrophosphates having an acid reaction, may also be used. The intended effect is also obtained with boric acid, oxalic acid and metaphosphoric acid, all of which are procurable in the form of powder. In such case, however, it is generally advisable, for the reasons hereinbefore set forth, to raise the melting point of the acid by means of suitable additions.

It has also been ascertained that the addition of small quantities, for example from 0.2 to 1%, of manganese dioxide, apart from its beneficial welding effect, facilitates the expulsion of the halogen hydracid from the flux, in accordance with the invention, during the welding process.

The welds obtained with the aid of fluxes in accordance with the invention, and from which any external traces of flux still present are removed by rinsing or brushing, do not exhibit any efflorescence or signs of decomposition, even after several months of storage or mechanical stressing, and the strength of the welded seams is thus permanently retained.

The methods otherwise customary for the welding of magnesium and magnesium alloys may be advantageously applied when using fluxes according to the invention. For example, it is advisable to apply the flux to the parts to be welded in the form of an aqueous or alcoholic suspension.

Example I

A saline mixture suitable for welding magnesium alloys and consisting of 10 parts of lithium chloride and 5 parts of potassium fluoride, is carefully mixed with 2 parts of pulverulent metaphosphoric acid $(HPO_3)_x$ and the powdery mixture is employed for welding. Even after the welded pieces have been stored for several months, the resulting welds show no signs of corrosion, and retain their strength.

Example II

A mixture of 12.5 parts of lithium bromide, 5 parts of potassium fluoride and 2 parts of monopotassium phosphate, in aqueous solution, furnishes equally good results.

Example III 100 grms. of monosodium phosphate and 5 to 10 grms. of manganese dioxide are added to 1 kg. of a flux, suitable for magnesium alloys and consisting of 15 parts of sodium chloride, 15 parts of potassium chloride and 2 parts of lithium fluoride. The flux also furnishes welds which, owing to the absence of decomposable particles of the flux, show no signs of corrosion, even after prolonged storage.

In carrying out the welding of magnesium and high percentage magnesium alloys with the afore-described fluxes it has occasionally been found, particularly when it is a question of welding stout-walled castings, that saline inclusions, although being regularly prevented from occurring at the actual seat of the weld including the margin of the latter, sometimes occur in a zone surrounding the actual weld and more or less coinciding with the places where the metal has been most strongly heated by the outer hollow cone of the welding flame which is oxidising, as distinguished from the inner—reducing—part of said flame.

According to a modification of the present invention and for the purpose of avoiding the aforesaid phenomenon, the acid compound is applied to the part or parts to be welded separately from the halide component, prior to carrying out the actual welding operation, around or upon and around the seat of the weld, whilst the halide component is subsequently applied to the seat of the weld.

It has been ascertained that, by operating in this manner, the inclusion of reactive salts at the seat of the weld is completely prevented, even in the case of stout castings, no corrosion being observed in the vicinity of the seam, even after protracted storage in moist air.

Bearing in mind the fact that the acid component must be made to adhere to the part or parts to be welded, such solutions of acid components as possess considerable viscosity are employed. Thus the several phosphoric acids (ortho-, pyro-, or meta-phosphoric acid) and solutions of phosphates, or oxides, in said acids, are primarily suitable for the purpose of the present invention.

Example IV

For the purpose of welding two cast parts, a thin coating of concentrated ortho-phosphoric acid is applied round the seat of the welding seam, in such a manner as to extend for a distance of about 2 or 3 cm. beyond the actual seam. The parts are then welded together with the aid of the usual halide flux and in the known manner. When this has been done, any residues of saline substances and phosphoric acid are removed by intensive washing. The resulting weld retains its appearance, even after protracted storage in moist air, and exhibits no signs of corrosion.

The term "solution of . . ." in the appended claims 7 to 9 is meant to include not only solutions in the usual meaning of term, but also solutions containing an excess of the dissolved substance or substances in suspension.

I claim:

1. A flux for welding magnesium and magnesium alloys comprising at least one alkali metal salt of the group consisting of chlorides and bromides, at least one alkali metal fluoride, and an acid alkali orthophosphate.

2. A flux for welding magnesium and magnesium alloys comprising at least one alkali metal salt of the group consisting of chlorides and bromides, at least one alkali metal fluoride, and monopotassium phosphate.

3. A flux for welding magnesium and magnesium alloys comprising at least one inorganic halide which is non-volatile at temperatures at which welding is carried out, manganese dioxide, and a compound selected from the group consisting of phosphoric, oxalic, and boric acids and the acid-reacting salts of such acids, such compounds being capable of reacting with said inorganic halide at the welding temperature so as to cause volatilisation of the halogen hydracid derived from said inorganic halide, with formation of non-gaseous reaction products having no corrosive action upon the metal to be welded.

4. A flux for welding magnesium and magnesium alloys comprising at least one alkali metal salt of the group consisting of chlorides and bromides, at least one alkali metal fluoride, manganese dioxide, and a compound selected from the group consisting of phosphoric, oxalic, and boric acids and the acid-reacting salts of such acids, such compounds being capable of reacting with said alkali metal salt at temperatures at which welding is carried out so as to cause volatilisation of the halogen hydracid derived therefrom, with formation of non-gaseous reaction products having no corrosive action upon the metal to be welded.

5. A flux for welding magnesium and magnesium alloys comprising at least one alkali metal salt of the group consisting of chlorides and bromides, at least one alkali metal fluoride, manganese dioxide, and an acid alkali orthophosphate.

6. A flux for welding magnesium and magnesium alloys comprising at least one alkali metal salt of the group consisting of chlorides and bromides, at least one alkali metal fluoride, manganese dioxide, and monopotassium phosphate.

7. A method of welding magnesium and magnesium alloys, which comprises applying a viscous solution of a compound selected from the group consisting of phosphoric, oxalic, and boric acids and the acid-reacting salts of such acids, such compounds being capable of reacting with an inorganic halide at temperatures at which welding is carried out so as to cause volatilisation of the halogen hydracid derived from said inorganic halide, with formation of non-gaseous reaction products having no corrosive action upon the metal to be welded, to a zone, of the parts to be welded, surrounding the seat of the weld to be formed, and subsequently welding the parts while applying a flux comprising at least one alkali metal salt of the group consisting of chlorides and bromides to the seat of the weld.

8. A method of welding magnesium and magnesium alloys, which comprises applying a viscous solution of at least one substance of the group consisting of ortho-, pyro-, and meta-phosphoric acid and solutions of metal phosphates and oxides in such acids, to a zone, of the parts to be welded, surrounding the seat of the weld to be formed, and subsequently welding the parts while applying a flux comprising at least one alkali metal salt of the group consisting of chlorides and bromides to the seat of the weld.

9. A method of welding magnesium and magnesium alloys, which comprises applying a concentrated solution of orthophosphoric acid to a zone, of the parts to be welded, surrounding the seat of the weld to be formed, and subsequently welding the parts while applying a flux comprising at least one alkali metal salt of the group consisting of chlorides and bromides to the seat of the weld.

10. In a method of welding magnesium and its alloys the step comprising, applying to the seat of the weld a flux comprising at least one inorganic halide which is non-volatile at temperatures at which welding is carried out, and a compound selected from the group consisting of phosphoric, oxalic, and boric acids and the acid-reacting salts of such acids capable of reacting with said inorganic halide at the welding temperature so as to cause volatilization of the halogen hydracid derived from said inorganic halide, with formation of non-gaseous reaction products having no corrosive action upon the metal to be welded.

JOSEF MARTIN MICHEL.